(12) United States Patent
Colaner

(10) Patent No.: US 6,968,757 B1
(45) Date of Patent: Nov. 29, 2005

(54) INSTALLATION TOOL FOR PLASTIC COATED PIPE

(76) Inventor: Douglas B. Colaner, 3151 Meadowwood St. NW., Massillon, OH (US) 44646

( * ) Notice: Subject to any disclaimer, the term of this patent is extended or adjusted under 35 U.S.C. 154(b) by 865 days.

(21) Appl. No.: 10/022,113

(22) Filed: Dec. 14, 2001

(51) Int. Cl.$^7$ .............................................. B25B 13/04
(52) U.S. Cl. ......................................... 81/120; 81/125
(58) Field of Search ........................... 81/120, 53.2, 54, 81/57.33, 125

(56) References Cited

U.S. PATENT DOCUMENTS

| | | | |
|---|---|---|---|
| 4,237,755 A | 12/1980 | Gunnell, III | |
| 4,741,229 A | * 5/1988 | Rachanski et al. | ........... 81/53.2 |
| 4,745,831 A | 5/1988 | Nutt et al. | |
| 4,799,987 A | 1/1989 | Sullins | |
| 4,977,799 A | * 12/1990 | Yasutomi et al. | ........... 81/53.2 |
| 5,018,903 A | 5/1991 | O'Donnell et al. | |
| 5,566,985 A | 10/1996 | Moore et al. | |
| 5,692,416 A | 12/1997 | Hamblin | |
| 6,212,709 B1 | 4/2001 | Newton | |

* cited by examiner

Primary Examiner—Debra S. Meislin
(74) Attorney, Agent, or Firm—Sand & Sebolt

(57) ABSTRACT

A tool and method for joining together two sections of plastic coated rigid metal pipe without applying pressure to the plastic coating to avoid damage thereto. The tool has a tubular body with an internally threaded open end which is loosely threaded onto one end of a section of pipe. A friction plate mounted on a threaded shaft within the body is advanced into pressure engagement with the peripheral end edge of the pipe to rotate the pipe through the frictional contact therebetween upon rotation of the body by a tool. The friction plate is loosely mounted on the shaft to compensate for irregularities in the end edge of the pipe. Rotating the tubular body in the opposite direction will disengage the friction plate from contacting the end edge of the pipe without rotating the pipe.

23 Claims, 4 Drawing Sheets

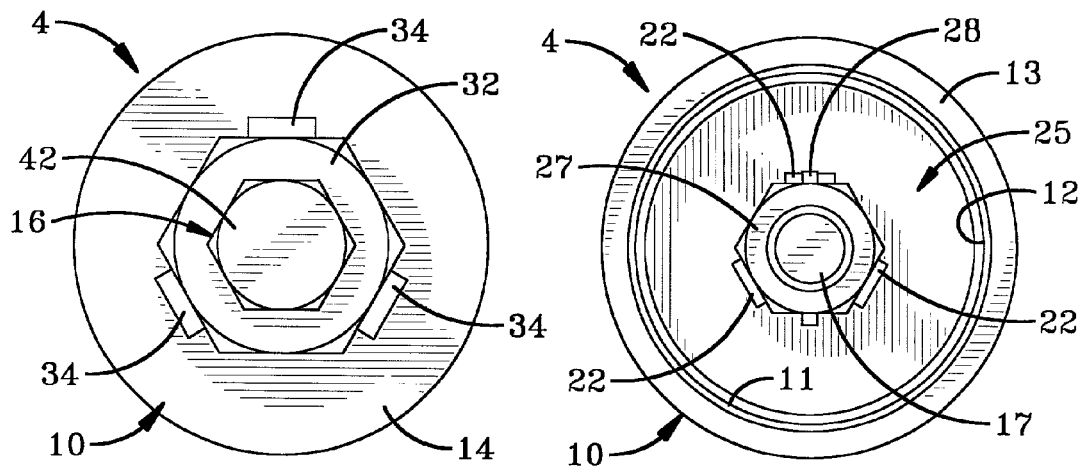
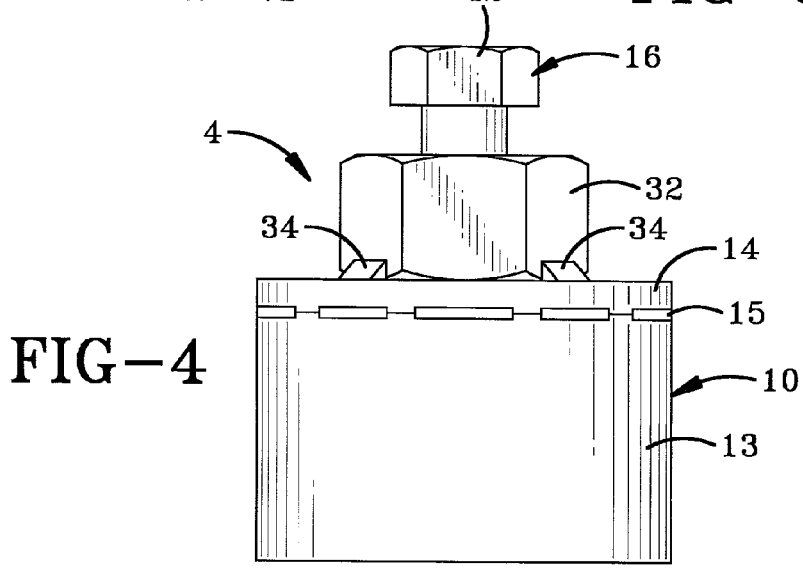
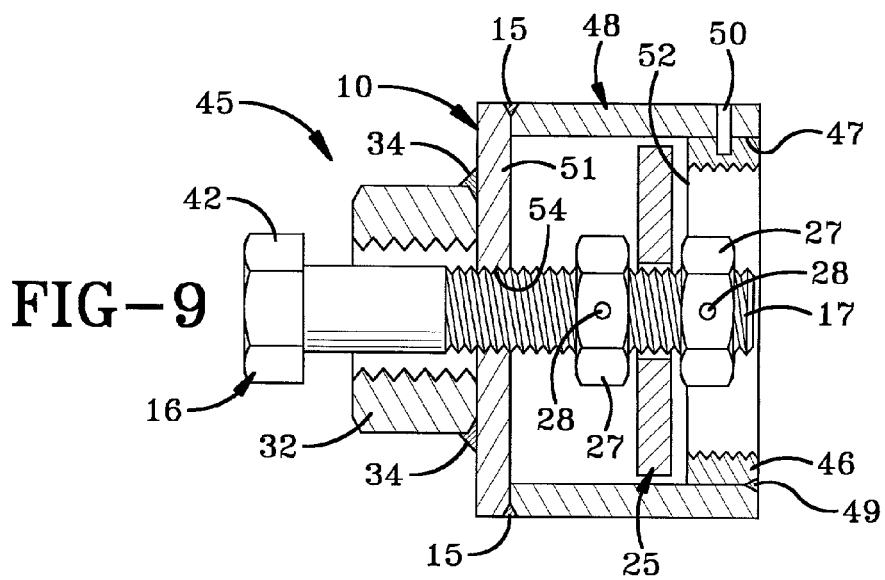

INSTALLATION TOOL FOR PLASTIC COATED PIPE

BACKGROUND OF THE INVENTION

1. Technical Field

The invention relates to tools, and in particular to a tool for coupling together rigid pipes covered with a protective coating to prevent damage to the coating.

2. Background Information

Various types of pipes have been developed for use in underground installations which are formed of various materials such as ceramics, metal, plastics, and/or combinations thereof. Although many of these pipes have been found suitable for their intended use, one type of pipe that is becoming increasingly more desirable is a rigid metal pipe having a plastic coating applied thereto, which the coating provides long life and maintenance free underground installations. These pipes are formed of rigid metal and have a plastic coating applied thereto such as PVC, with the ends of the pipes being threaded for joining lengths thereof by threaded coated couplings.

However, one problem that is encountered with such plastic coated pipes is the ability to securely join the ends of two pipe lengths together, usually by an intervening coupling, in a sufficiently tight relationship without damaging the plastic coating and harming the integrity of the pipe's longevity against corrosion.

One type of device used is a fabric or cloth strap wrench in which a strap of fabric is looped around the pipe and then the pipe is rotated by a lever attached to the fabric strap. However, it has been found that these cloth or fabric straps will damage the plastic coating and/or will slip, especially when the coating is wet, making it difficult to secure the desired joint tightness. Other types of devices such as standard pipe wrenches could seriously mar and damage the plastic coating, even if a protective cloth or shield is placed on the pipe prior to using the wrench since the wrench must ultimately cut into the plastic coating in order to provide sufficient gripping power for rotating the pipe into a remote coupling to join together sections of pipes, especially in underground installations.

Therefore, the need exists for an improved installation tool and method of using the same, wherein two sections of plastic coated pipe can be joined without requiring harmful contact with the plastic coating.

BRIEF SUMMARY OF THE INVENTION

One aspect of the invention is to provide an installation tool which will join together sections of plastic coated pipe without contacting the plastic coating when rotating the pipe length into a remote coupling.

Another feature of the invention provides such a coupling tool which can be easily modified for use with various pipe diameters and which can be installed easily on the pipe by hand tightening and then subsequently rotated together with the pipe, by a ratchet wrench or similar lever type device, and in which the tool can be easily removed from the threaded pipe end after the pipe length has been joined to an adjacent pipe length by an intervening coupling.

Another aspect of the invention is to provide such an installation tool which has only a single movable bolt which extends axially through the center of an elongated tubular metal body and which utilizes a friction plate which is mounted on the bolt to engage the peripheral edge of the pipe section being installed after the tool has been hand threaded onto the threaded end of the pipe section.

A further feature of the invention is to provide the tool with a floating friction plate which will tilt to conform to the configuration of the peripheral end edge of the pipe section, thereby compensating for manufacturing tolerances and irregularities in the pipe end, and to prevent burring of the pipe end.

Another feature of the invention is to provide such a device which is relatively inexpensive to construct, extremely easy to use by a workman, which can be subjected to abuse in the field without appreciable damage thereto; and which can speed up the installation of the pipes.

A further advantage is that the tool provides a self-diagnosis on the connection between the installed section of pipe and the coupling.

These objectives and advantages are obtained by the installation tool of the present invention the general nature of which may be stated as a tool for rotatably connecting together two lengths of pipe including a body having an internally threaded open end adapted to be threadably engaged with an externally threaded first end of one of said two lengths of pipe, a bolt threadably movable withing the body, and a friction plate mounted on the bolt and movable within the body upon movement of the bolt, said plate being frictionally engageable with a peripheral edge of the first end of said one length of pipe to rotate said length of pipe upon rotation of said body.

These objectives and advantages are further obtained by the improved method of the invention, the general nature of which may be stated as including the steps of threadably mounting a body having an internally threaded open first end onto a second threaded end of the pipe, advancing a friction member which is axially movably mounted within the body into pressure frictional engagement with a peripheral edge of the second end of the pipe, and rotating the body to rotate the pipe and correspondingly the first end of the pipe into the threaded connector through the frictional engagement of the friction member with the peripheral edge of the second end of the pipe.

BRIEF DESCRIPTION OF THE DRAWINGS

Preferred embodiments of the invention, illustrative of the best modes in which applicant contemplates applying the principles, are set forth in the following description and are shown in the drawings and are particularly and distinctly pointed out and set forth in the appended claims.

FIG. 2 is a top plan view of the installation tool;

FIG. 3 is a bottom plan view of the FIG. 2;

FIG. 4 is a side elevational view of FIG. 2;

FIG. 9 is a reduced sectional view of a modified installation tool for use with a smaller diameter plastic coated pipe.

DETAILED DESCRIPTION OF THE INVENTION

Figure 1:
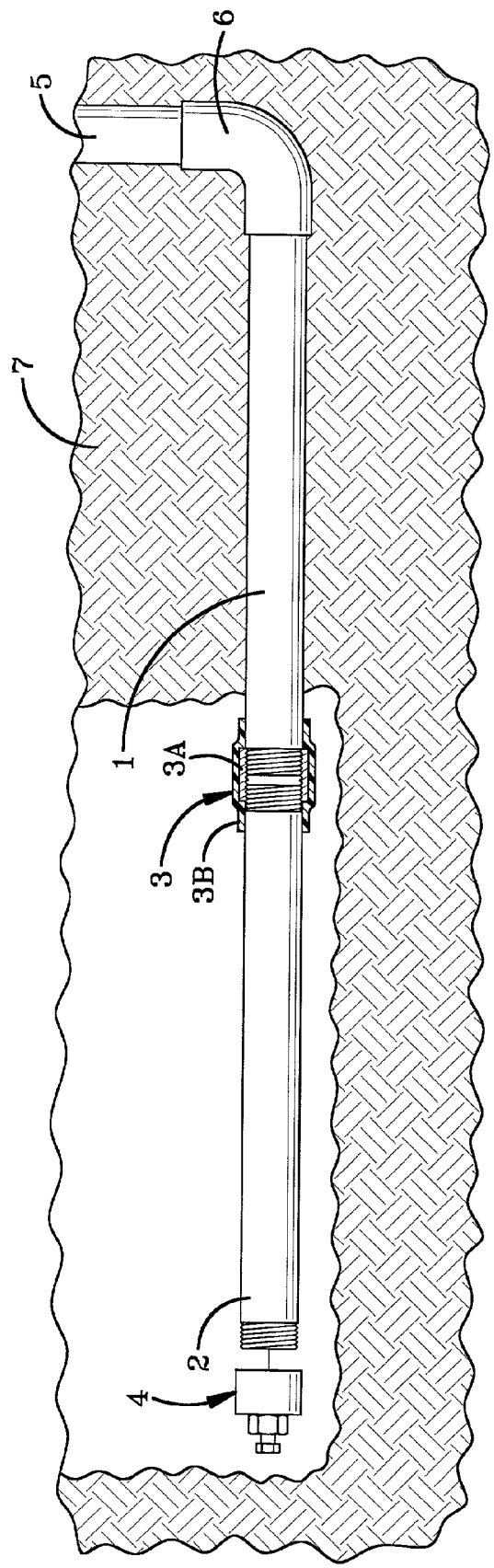
FIG. 1 is a diagrammatic view of two sections of plastic coated pipe being joined by a coupling using the installation tool of the present invention.
Figure 5:
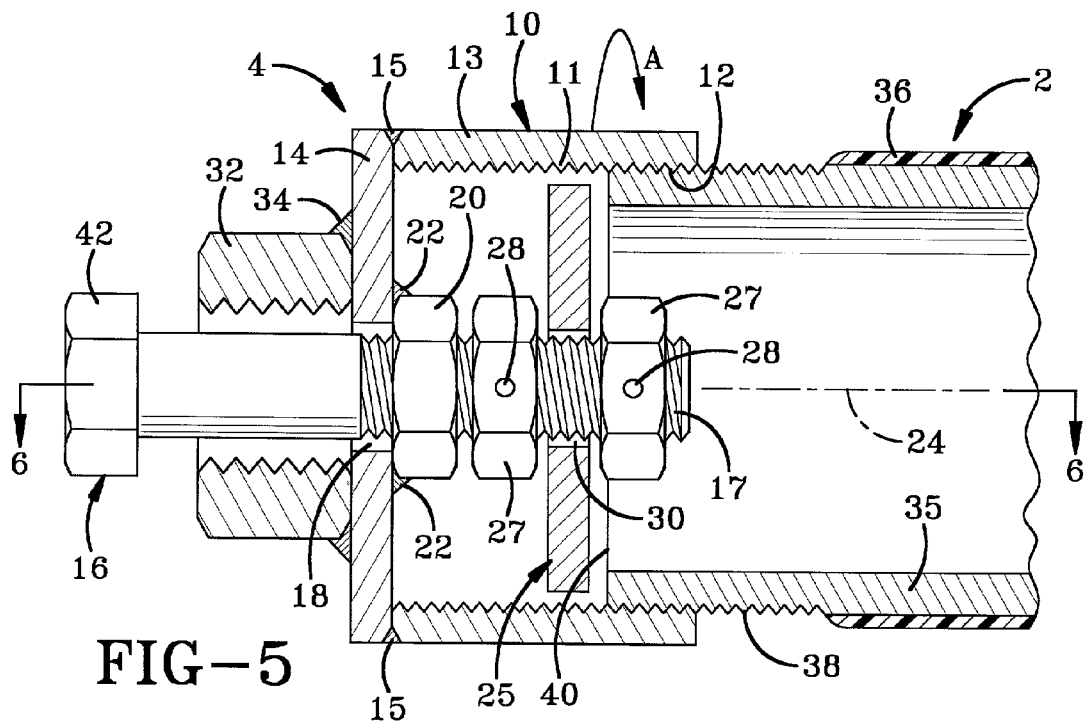
FIG. 5 is a sectional view showing the tool being installed on the end of a section of plastic coated pipe.

FIG. 1 is a diagrammatic representation of a typical underground pipe installation wherein two lengths of pipe indicated at 1 and 2, are joined by a coupling 3 by the improved installation tool of the present invention indicated generally at 4. Coupling 3 preferably is the type comprising an internally threaded inner metal sleeve 3A having a plastic boot 3B molded thereon. Pipe 1 may extend further or be joined to an uprising pipe section 5 by an elbow 6 which will enable pipe 1 to be non-rotatably secured in the ground 7. In other installations where a number of pipe lengths are joined together, the weight of the dirt on top of the various pipe lengths will prevent pipe 1 from rotating when pipe 2 is secured thereto.

The improved installation tool 4 is shown particularly in FIGS. 2–5. Tool 4 includes a generally elongated rigid body 10 preferably formed of metal, having a cylindrical or tubular configuration, and is provided with internal threads 11 which may extend completely throughout the length of body 10 or only partially into an open end 12 thereof. Preferably, the opposite end of tubular body 10 is closed by a disc-shaped end plate 14 which preferably is secured to sidewall 13 of tubular body 10 by welds 15. If desired, tubular body 10 including end plate 14, may be formed as an integral one-piece member, avoiding the use of welds 15 without affecting the concept of the invention.

A bolt indicated generally at 16, has a externally threaded shaft 17 and extends through an enlarged opening 18 formed in end plate 14. Bolt 16 is rotatably mounted within body 10 by an internally threaded nut 20 which is secured to end plate 14 by welds 22 or other attachment means. If desired, opening 18 could be internally threaded for rotatably advanced bolt 16 along a central axis 24 of tubular body 10, eliminating internally threaded nut 20.

In accordance with one of the features of the invention, a friction plate indicated generally at 25, preferably has a circular disc-shaped configuration with a diameter slightly less than the internal diameter of tubular body 10, is loosely mounted on threaded shaft 17 of bolt 16 between a pair of stop nuts 27. Nuts 27 may be fixed on threaded shaft 17 by roll pins 28 or other types of fastening means, such as welds, adhesives, or the like. Friction plate 25 has a central opening 30 which is slightly larger than the outer diameter of threaded shaft 17 to provide for a loose mounting thereon to enable friction plate 25 to tilt slightly on shaft 17. If desired, an enlarged nut 32 may be secured on the outer surface of end plate 14 by welds 34 and has an enlarged central opening 37 through which bolt shaft 17 projects, the function of which is discussed further below.

Pipes 1 and 2 are formed of a rigid metal 35 having a plastic coating 36 applied thereon, except for threaded ends 38 thereof which is relatively free of plastic. Coating 36 may be formed of various types of plastic, the most common of which is PVC, although other types of coatings can be utilized without affecting the concept of the invention.

Figure 6:
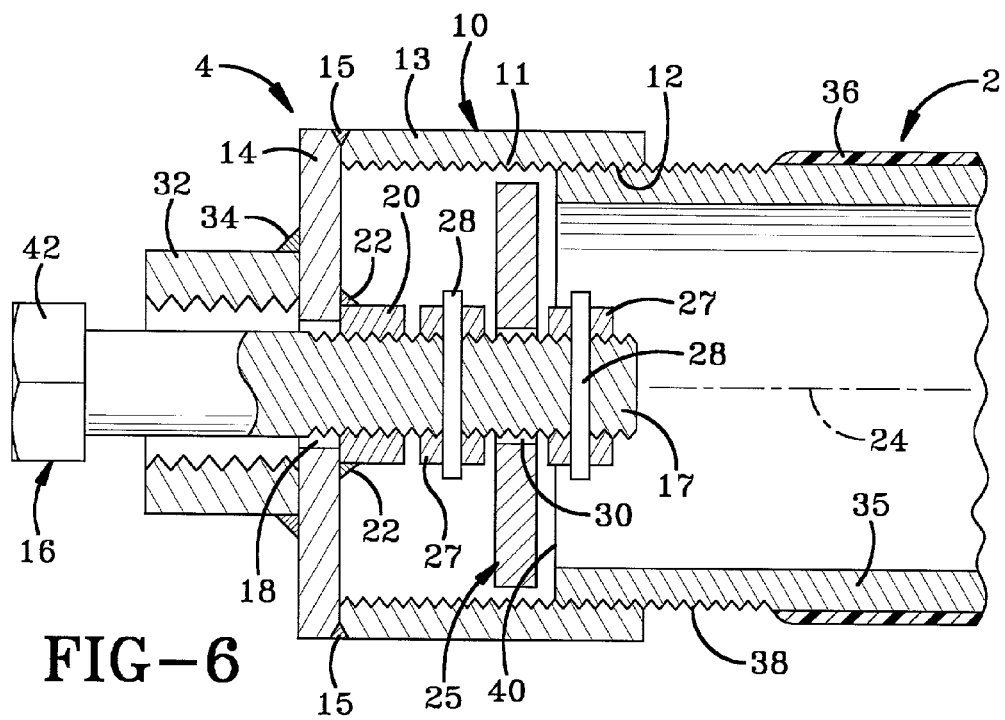
FIG. 6 is a sectional view taken on line 6—6, FIG. 5.
Figure 7:
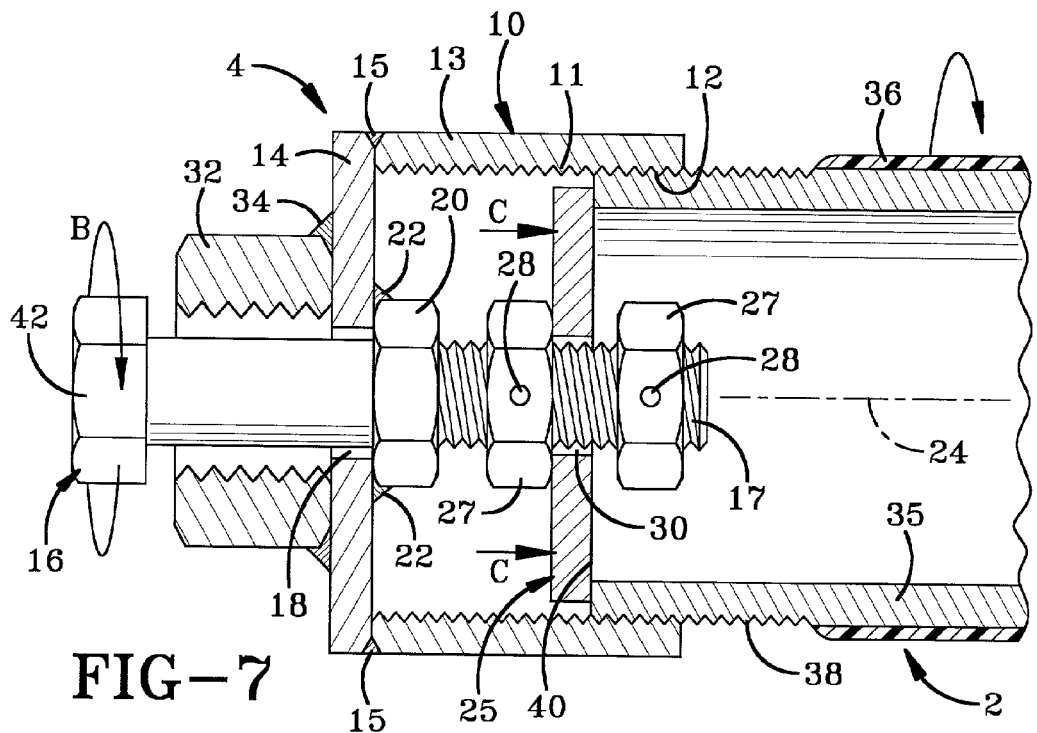
FIG. 7 is a view similar to FIG. 5 showing the friction plate in clamping engagement with the peripheral end edge of the pipe section.
Figure 8:
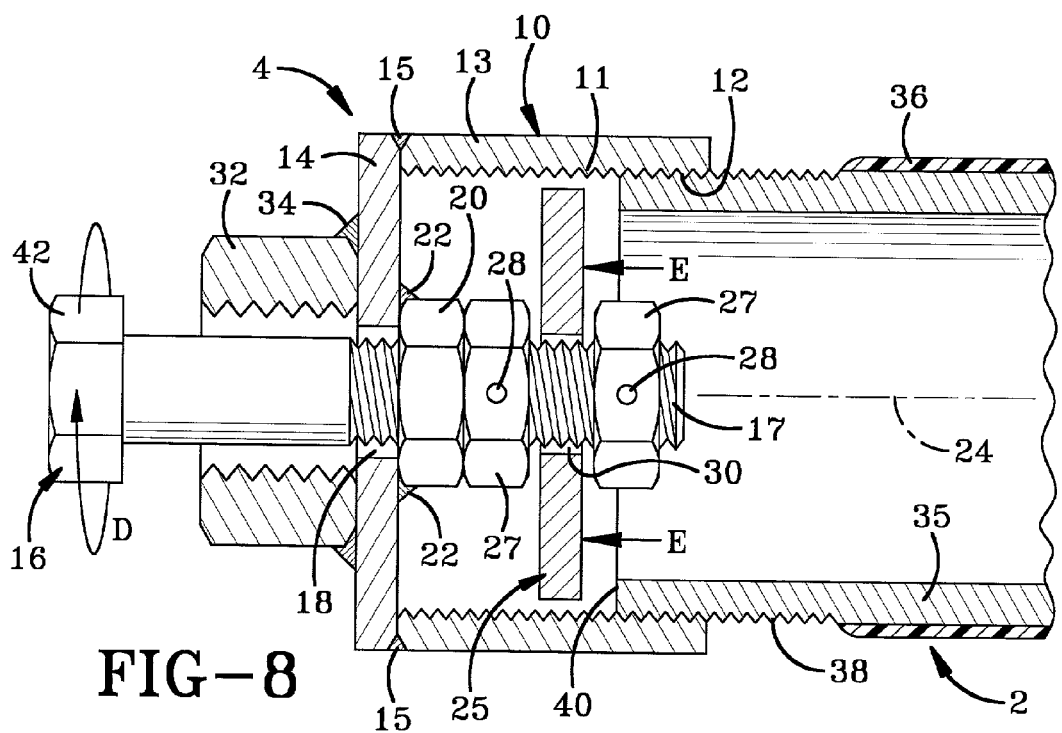
FIG. 8 is a view similar to FIG. 7 showing the friction plate being released from engagement with the pipe end edge prior to removing the tool from the installed section of pipe.

The method of utilizing installation tool 4 is best shown in FIGS. 6, 7, and 8. Tool 4 is hand mounted on pipe threads 38 by rotating it in a clockwise direction (arrow A) FIG. 5. This will advance tubular body 10 along threads 38 until friction plate 25 is nearly engaged or is actually engaged with the peripheral end edge 40 of pipe 35. In the alternative, bolt 16 can be rotated in a clockwise direction as shown by Arrow B in FIG. 7, until friction plate 25 is pressed tightly against peripheral end edge 40 of metal pipe 35 after body 10 has been rotatably mounted thereon. A ratchet wrench or other type of tool (not shown) is then placed on head 42 of bolt 16 and continues to rotate bolt 16 in direction of Arrow B moving friction plate 25 into a tighter frictional engagement against peripheral edge 40 as shown by Arrows C, FIG. 7 due to fixed innermost nut 27 pressing against friction plate 25. The loose mounting of friction plate 25 on threaded shaft 17 will enable plate 25 to conform more closely to the contour and any irregularities in peripheral end edge 40 to provide a very tight frictional engagement therebetween.

Bolt 16 is continued to be rotated by an appropriate tool on bolt head 42 which will continue to maintain a tight frictional engagement between plate 25 and pipe end 40 and as a result will rotate pipe 2 in a clockwise direction advancing it further into coupling 3 until it is tightly secured therein, in which position it will be closely adjacent or abutted against the end of pipe 1. No matter how much pressure is exerted on bolt 16 and between plate 25 and pipe end edge 40, tubular body 10 will not advance further along threaded end 38 of pipe 35. Therefore, after the desired tightness has been achieved between pipe 2 and coupling 3, the ratchet wrench or other tool merely rotates bolt 16 in a reverse or counterclockwise direction as shown by Arrow D in FIG. 8, which will retract bolt 16 in the direction of Arrows E which will loosen the frictional engagement between friction plate 25 and pipe end 40. This will enable tubular body 10 to be easily rotated in a counterclockwise direction to disengage it from threaded end 38. Should for some reason tubular body 10 become stuck on threaded end 38, a wrench can be applied to enlarged nut 32 enabling tubular body 10 to be easily removed from threaded pipe end 38 without applying an excessive counterclockwise force on pipe 2 to loosen its previous tightened engagement with coupling 3. It also can be used when rear nut 27 becomes tightly pressed against nut 20 as shown in FIG. 8, when removing the tool from the pipe end, to reset the tool to the position of FIG. 5 for reuse on the next pipe.

In the event the threaded pipe end is not properly seated in metal sleeve 3A of coupler 3, the pipe will back off from the coupler when the tool is being removed indicating to the workman that a problem exists with the connection. This provides a self-diagnosing feature since the connection with sleeve 3A is not visible within boot 3B.

A slightly modified form of the improved installation tool is indicated generally at 45, and is shown in FIG. 9. In embodiment 45, an internally threaded sleeve 46 is mounted within an open end 47 of a tubular body 48 by welds 49 or a roll pin 50. If desired, an externally threaded area or sleeve 46 can engage internal threads, such as threads 11, to secure sleeve 46 in body 48. This provides for the use of tool 45 on a smaller outer diameter pipe due to the insertion of sleeve 46 therein. Likewise, inner edge 52 of sleeve 46 can serve as a stop for friction plate 25. If desired, end plate 51 may have a threaded opening 54 which threadably engages threaded shaft 17 eliminating nut 20. The other functions and operations of the other components of embodiment 45 are the same as that described above with respect to tool 4, and thus are not described in further detail.

It is further understood that friction plate 25 can be rigidly mounted on bolt shaft 17 and advanced into engagement with pipe end edge 40 without being loosely mounted between a pair of bolts 27. However, the loose mounting of friction plate 25 is better able to compensate for irregularities in the pipe end edge to increase the frictional engagement therebetween and reduces the marring of the pipe end.

Likewise as previously indicated, bolt 16 could be threadably advanced along the axis of tubular body 10 by other types of threaded connections between end plate 14 and the threaded shaft then that shown in the drawings and described above. Furthermore, body 10 can have other configurations then the tubular or cylindrical configuration as shown in the drawings and described above, without affecting the concept of the invention. Again, the principle feature is the use of a friction plate which engages the peripheral end edge of the pipe whereby advancement of this friction plate and subsequent rotation thereof through a bolt or other type of connection, will be imparted onto pipe 2 for rotating the pipe into coupling 3, elbow 6, or other type of remote connection, all of which occurs without disturbing or contacting plastic coating 36. Some of the plastic coating 36 may extend along the threads and has to be removed or cut into when body 10 is rotated thereon. Again, bolt 32 assists in the installation and removal of body 10 from threaded end 38 should this occur.

Accordingly, improved installation tools 4 and 45 provide a relatively simple and inexpensive device which is extremely durable and rugged in use, which is relatively maintenance free and unaffected by the harsh environment in which it will be utilized, and which enables pipes to be rapidly joined without applying rotational pressure to the protective coating on the pipe by applying frictional engagement between a friction plate to the peripheral end edge of the pipe.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A tool for rotatably connecting together two lengths of pipe including:
   a body having an internally threaded open end adapted to be threadably engaged with an externally threaded first end of one of said two lengths of pipe;
   a bolt threadably movable withing the body; and
   a friction plate mounted on the bolt and movable within the body upon movement of the bolt, said plate being frictionally engageable with a peripheral edge of the first end of said one length of pipe to rotate said length of pipe upon rotation of said body.

2. The tool defined in claim 1 wherein the body has a second end opposite the open end which includes a threaded opening; and in which the bolt has an externally threaded shaft engaged within said threaded opening of the second end.

3. The tool defined in claim 2 wherein the second end of the body includes an end plate secured to said body, an enlarged hole is formed in said end plate through which the bolt extends, and a nut forming the threaded opening is secured to said end plate and aligned with said enlarged hole.

4. The tool defined in claim 1 wherein a pair of stop members are mounted on the bolt; and in which the friction plate is loosely trapped between said stop members.

5. The tool defined in claim 3 in which a nut is secured to an outer surface of the end plate of the body and is formed with an enlarged central opening; and in which the bolt extends through said central opening.

6. The tool defined in claim 1 wherein a sleeve is secured within the open end of the body and has an internally threaded area which forms the internally threaded open end of said body.

7. The tool defined in claim 6 wherein the sleeve has an inner annular edge within the body which forms a stop for the friction plate.

8. The tool defined in claim 1 wherein the body has an elongated cylindrical sidewall with the end plate being disc-shaped and secured to said sidewall by a weld.

9. The tool defined in claim 1 wherein the friction plate is disc-shaped and has a diameter less than an inner diameter of the body.

10. In combination first and second lengths of pipes, a coupling for joining together opposed ends of said pipes and a tool for rotating the first length of pipe which has two threaded ends into threaded engagement with the coupling, said tool having a hollow body with an open end and internal threads adjacent said open end for threadably mounting the tool on said first length of pipe, a shaft rotatably mounted on the body and movable axially within a hollow interior of said body, and a friction member mounted on the shaft and movable into pressure engagement with a peripheral end edge of the first length of pipe for rotating said first length of pipe into the coupling.

11. The combination defined in claim 10 wherein the first length of pipe is metal and has an outer plastic coating.

12. The combination defined in claim 11 wherein the plastic coating is PVC.

13. The combination defined in claim 10 wherein the tool body has a second end opposite of the open end which includes an internally threaded opening; and in which the shaft is threadably engaged within said threaded opening.

14. The combination defined in claim 13 wherein the second end of the body includes a disc-shaped end plate secured to said body, an enlarged hole through which the shaft extends and a nut secured to said end plate aligned with said enlarged hole for threadably receiving the shaft therein.

15. The combination defined in claim 10 wherein a pair of stop members are mounted on the shaft; and in which the friction member is loosely trapped between said stop members.

16. A method for joining a first threaded end of a section of pipe into a threaded coupling comprising the steps of:
    threadably mounting a body having an internally threaded open first end onto a second threaded end of the pipe;
    advancing a friction member which is axially movably mounted within the body into pressure frictional engagement with a peripheral edge of the second end of the pipe; and
    rotating the body to rotate the pipe and correspondingly the first end of the pipe into the threaded connector through the frictional engagement of the friction member with the peripheral edge of the second end of the pipe.

17. The method defined in claim 16 including the step of loosely mounting the friction member on a shaft which is rotatably mounted within the body.

18. The method defined in claim 17 including the step of providing a threaded opening on a second end of the body, and threadably mounting the shaft therein.

19. The method defined in claim 16 including the step of mounting an internally threaded sleeve within the open end of the body to form said internally threaded first open end.

20. The method defined in claim 16 including the step of forming the pipe of metal having an external plastic coating applied thereto.

21. In combination first and second lengths of pipes and a tool for rotating the first length of pipe into coupled engagement with the second length of pipe, said tool having a hollow body with an open end for mounting the tool on said first length of pipe, and a friction member mounted within the body and movable into pressure engagement with a peripheral end edge of the first length of pipe for rotating said first length of pipe into coupling engagement with said second length of pipe.

22. The combination defined in claim 21 wherein the body has a threaded area adjacent the open end for mounting the tool on said first length of pipe; and in which the friction member is mounted on a shaft which is rotatably movable within the body.

23. The combination defined in claim 22 wherein the friction member is a disc-shaped plate loosely mounted on the shaft between a pair of stop members.

* * * * *